US012132643B1

(12) United States Patent
Nandy et al.

(10) Patent No.: US 12,132,643 B1
(45) Date of Patent: Oct. 29, 2024

(54) MULTICAST DATAPATH TRACING IN LAYER-2 NETWORKS

(71) Applicant: Hewlett Packard Enterprise Development LP, Spring, TX (US)

(72) Inventors: Tathagata Nandy, Bangalore (IN); Subramanian Muthukumar, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/211,467

(22) Filed: Jun. 19, 2023

(51) Int. Cl.
*G06F 15/16* (2006.01)
*H04L 45/00* (2022.01)
*H04L 45/16* (2022.01)
*H04L 45/42* (2022.01)

(52) U.S. Cl.
CPC ............. *H04L 45/16* (2013.01); *H04L 45/42* (2013.01); *H04L 45/566* (2013.01)

(58) Field of Classification Search
CPC .............................. H04L 45/16; H04L 45/566
See application file for complete search history.

(56) References Cited

U.S. PATENT DOCUMENTS

| 6,538,997 | B1 * | 3/2003 | Wang | H04L 12/462 370/256 |
| 7,016,351 | B1 * | 3/2006 | Farinacci | H04L 45/26 370/312 |
| 7,149,794 | B1 * | 12/2006 | Attili | H04L 45/00 709/224 |
| 10,833,808 | B1 * | 11/2020 | Lal | H04L 1/12 |
| 2010/0272106 | A1 * | 10/2010 | Pan | H04L 49/555 370/390 |
| 2010/0290465 | A1 * | 11/2010 | Ankaiah | H04L 12/4633 370/390 |
| 2012/0051231 | A1 * | 3/2012 | Ou | H04L 12/18 370/248 |
| 2012/0147743 | A1 * | 6/2012 | Singh | H04L 12/185 370/230 |
| 2013/0128751 | A1 * | 5/2013 | Keesara | H04L 41/0677 370/248 |

(Continued)

FOREIGN PATENT DOCUMENTS

WO   WO-2012103694 A9 * 10/2012 ............. H04L 43/10
WO   WO-2014041550 A1 *  3/2014 ........... H04L 12/185

*Primary Examiner* — Hieu T Hoang
(74) *Attorney, Agent, or Firm* — Yao Legal Services, Inc.

(57) ABSTRACT

During operation, a layer-3 (L3) router can receive a trace query to trace multicast paths associated with a multicast group. In response to detecting a layer-2 (L2) switch coupled to the L3 router, the L3 router can construct a request packet and send the request packet to the coupled L2 switch. The request packet comprises a first data block indicating that the request packet is an L2 multicast trace request, thereby causing the L2 switch to propagate the request packet to downstream L2 switches until the request packet reaches a last-hop L2 switch. The L3 router can receive, from the last-hop L2 switch, a reply packet responsive to the L2 multicast trace request, the reply packet comprising one or more data blocks, with each data block comprising information about an L2 switch or client device present on a traversed multicast path for the multicast group.

18 Claims, 10 Drawing Sheets

(56) References Cited

U.S. PATENT DOCUMENTS

| | | | | |
|---|---|---|---|---|
| 2014/0348022 A1* | 11/2014 | Jain | ................... | H04L 41/12 |
| | | | | 370/254 |
| 2015/0055651 A1* | 2/2015 | Shen | ................... | H04L 12/1854 |
| | | | | 370/390 |
| 2015/0222510 A1* | 8/2015 | Vaidya | ................... | H04L 43/10 |
| | | | | 370/242 |
| 2020/0344155 A1* | 10/2020 | Chhibber | ................ | H04L 47/15 |
| 2022/0123849 A1* | 4/2022 | McCall | ................ | H04J 3/0658 |

* cited by examiner

MULTICAST DATAPATH TRACING IN LAYER-2 NETWORKS

BACKGROUND

Field

This disclosure is generally related to a multicast network with layer-2 (L2) switches. More specifically, this disclosure is related to path tracing in the L2 multicast network.

BRIEF DESCRIPTION OF THE FIGURES

In the figures, like reference numerals refer to the same figure elements.

DETAILED DESCRIPTION

Multicast allows data to be sent from a single source to multiple destinations simultaneously. Multicast data is only sent once but can be received by multiple endpoints that have subscribed to a specific multicast group. Essentially, multicast distributes the stream of data to multiple recipients without creating separate streams for each destination. Multicast can conserve network bandwidth and reduce the overall network traffic. Multicast is commonly used for delivering streaming media, IPTV, VoIP, and video conferencing. Compared with unicast communication, multicast communication requires specialized network hardware and protocols to function properly.

Like traceroute used for tracing the paths of unicast traffic, multicast trace (Mtrace) can be used to identify the path taken by multicast traffic through a network. Mtrace enables network administrators to troubleshoot issues with multicast traffic, such as missing or delayed packets. Mtrace can be initiated by an Mtrace client, which sends a Mtrace query to a last-hop router (LHR). The LHR translates the query to a request packet and forwards the request packet upstream until it reaches the source-connected router or first-hop router (FHR). Each router along the traced path adds its forwarding information to the received request packet. The FHR adds its local forwarding information to the request packet, converts the request packet into an Mtrace reply packet, and sends the reply packet to the Mtrace client. The reply packet contains the trace information. However, Mtrace only works in L3 (IP) networks and cannot provide information about L2 (Ethernet) switches that may be present between the end clients and the LHR. Many campus multicast networks include L2 switches. In certain scenarios, a multicast network may include a cascading of multiple L2 switches, each switch adding a certain amount of latency to the multicast traffic. Multicast path tracing in the L2 network can play an important role in monitoring the performance of the multicast network.

Figure 1:
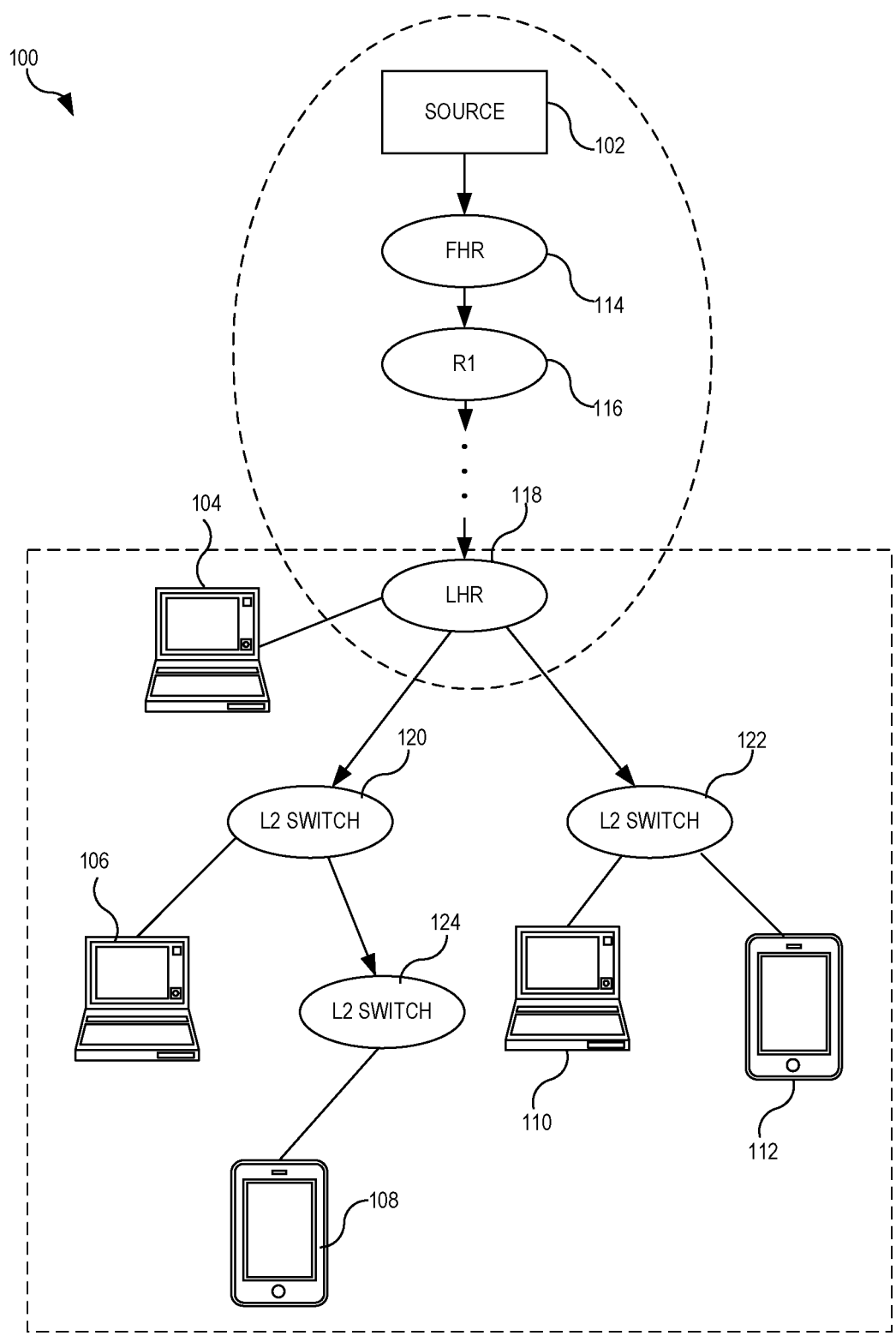
FIG. 1 illustrates an example of a network environment facilitating multicast path tracing in layer-2 (L2) networks, according to one aspect of the instant application.

FIG. 1 illustrates an example of a network environment facilitating multicast path tracing in layer-2 (L2) networks, according to one aspect of the instant application. In FIG. 1, a multicast network 100 can include a source 102 and a number of group members (i.e., client devices receiving multicast traffic from source 102), including client devices 104-112. Source 102 can be a host sending packets with a destination IP address set to a multicast group, and a group member can be a host or client device that expresses interest in receiving packets sent to a specific group address of the multicast group. FIG. 1 also shows a number of L3 routers (e.g., IP routers) and L2 switches (e.g., Ethernet switches) that route packets from source 102 to the client devices.

In the example shown in FIG. 1, the L3 routers along the multicast path can include a first-hop router (FHR) 114, one or more intermediate routers (e.g., R1 116), and a last-hop router (LHR) 118. FHR 114 can be the router that is directly coupled to source 102. Among the plurality of routers along the multicast path, LHR 118 can be a router closest to client devices receiving multicast traffic. LHR 118 can include a number of multicast-enabled interfaces, and each interface can be coupled to a client device or an L2 switch. In this example, LHR 118 includes three interfaces, one interface is coupled to client device 104, and the other two interfaces are respectively coupled to L2 switches 120 and 122. An L2 switch can also include one or more multicast-enabled interfaces, with some interfaces coupled to client devices and some interfaces coupled to downstream L2 switches. In this example, L2 switch 120 includes two interfaces, one interface is coupled to client device 106, and the other interface is coupled to downstream L2 switch 124; L2 switch 122 includes two interfaces respectively coupled to client devices 110 and 112, and L2 switch 124 includes one interface coupled to client device 108.

Mtrace can be used to determine, hop by hop, the path taken by the multicast traffic from the source to a receiver coupled to the LHR. For example, Mtrace can be used to trace the multicast traffic from source 102 to client device 104, which is coupled to LHR 118. However, Mtrace only works in the L3 domain and will not be able to provide information regarding the L2 switches (e.g., switches 120-124) on the path of the multicast traffic. For example, Mtrace cannot be used to trace the entire path between source 102 and client device 108. In order to enable L2 multicast path tracing, according to some aspects of the instant application, when an LHR receives a multicast trace query for a multicast group from a client device (or client), it can perform L2-enhanced multicast path tracing (or simply enhanced multicast path tracing), which can include the L3 Mtrace operation upstream toward the source and the L2 multicast trace operation downstream toward the last-hop L2 switch. Note that a last-hop L2 switch is an L2 switch that is not coupled to any downstream L2 switch receiving multicast traffic for the group. In the example shown in FIG. 1, L2 switches 120-124 all receive multicast traffic for a group, and L2 switches 122 and 124 are last-hop L2 switches.

According to one aspect, a client can initiate an L2-enhanced multicast trace operation for a multicast group by sending a query packet to the LHR of the multicast group. The query packet can specify a multicast group and a source address and can be referred to as an (S, G) query, where S represents the source address, and G represents the multicast group address. If the L2-enhanced multicast trace function is enabled on the LHR, the LHR can perform the Mtrace operation followed by the L2 multicast trace operation. If the L2-enhanced multicast trace function is not enabled on the LHR, the LHR can only perform the Mtrace operation in the L3 domain.

More specifically, to perform the Mtrace operation, the LHR can generate a request packet (which can be referred to as an Mtrace request packet) based on the received query. Note that the request message type enables each of the upstream routers processing the message to apply different packet and message validation rules than those required for the handling of a query packet. The multicast destination IP address of the request packet can be the all-routers multicast group address, which is 224.0.0.2 for IP Version 4 and FF02::2 for IP Version 6. The LHR can append a data block containing its interface addresses and packet statistics to the request packet and then forward the packet toward the source. In a similar fashion, each upstream L3 router receiving the request packet can append a data block to the end of the request packet before forwarding it to its upstream router. The data block can be a Standard Response Block (SRB) defined by RFC 8487 of the Internet Engineering Task Force (IETF). When the FHR receives the request packet, it can append its own SRB to the request packet, convert the request packet into a reply packet, and unicast the reply packet to the client initiating the trace operation. The Mtrace operation can provide information about all L3 routers on the multicast path (e.g., routers 114-118 in FIG. 1).

Subsequent to the Mtrace operation, the LHR can construct, based on the received query packet, a second request packet (which can be referred to as an L2 multicast trace request packet). According to some aspects, the LHR can append a special data block to the Mtrace request packet to indicate that the new packet is an L2 multicast trace request packet. According to one aspect, the special data block can be an Augmented Response Block (ARB) defined by RFC 8487 of the IETF.

Figure 2:
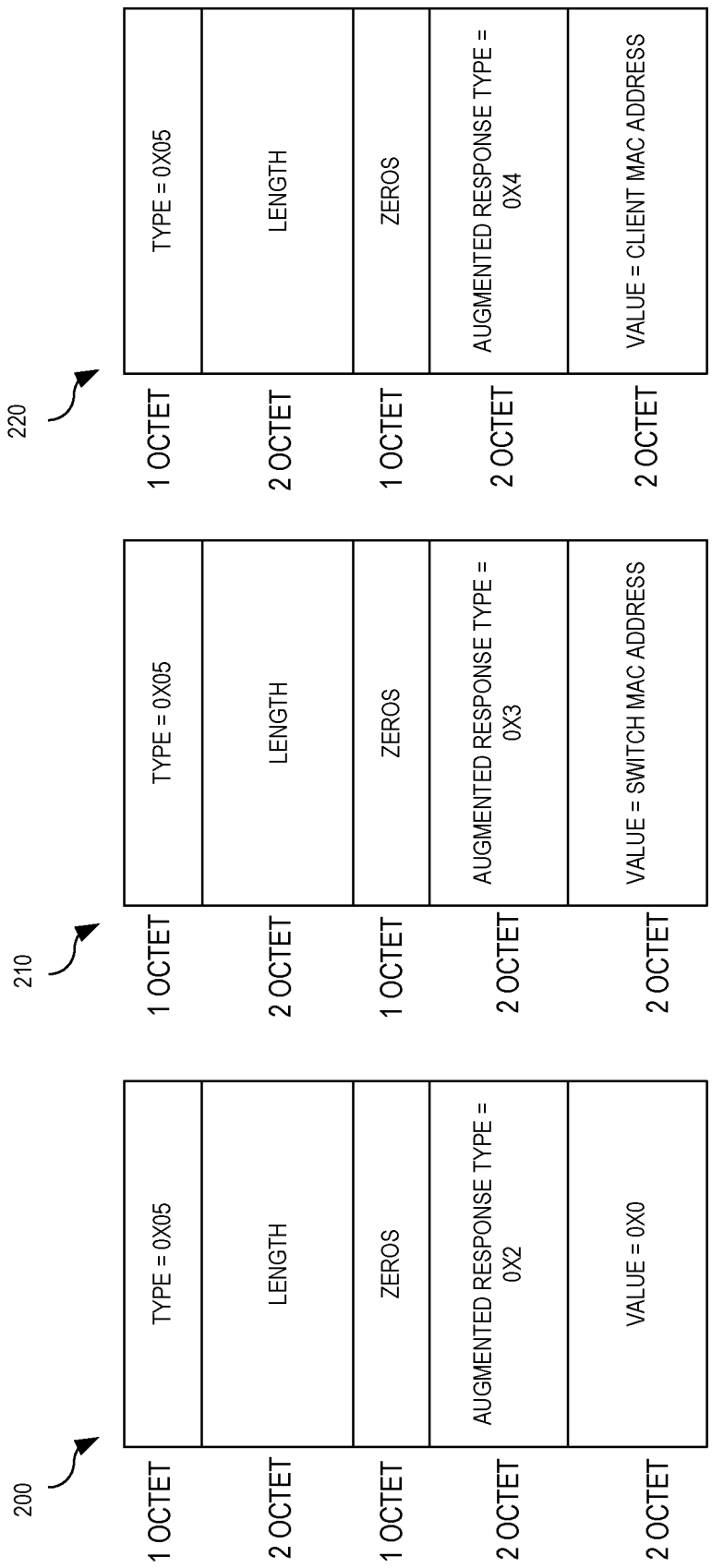
FIG. 2A illustrates an example of an appended data block in the layer-2 multicast trace request packet, according to one aspect of the instant application.
FIG. 2B illustrates an example of the data block appended to the layer-2 multicast trace request packet by a switch, according to one aspect of the instant application.
FIG. 2C illustrates an example of the data block associated with a client device, according to one aspect of the instant application.

FIG. 2A illustrates an example of an appended data block in the L2 multicast trace request packet, according to one aspect of the instant application. In this example, the data block can be an ARB 200, which can include a 1-octet type field, a 2-octet length field, a 1-octet zeros field (which only contains zeros), a 2-octet augmented response type field, and a value field.

ARB 200 can be part of a message exchanged between devices in the multicast network. The type field of ARB 200 can be 0X05, indicating that the data block is an ARB. The augmented response type field of ARB 200 can be 0X2, indicating that the packet containing ARB 200 is an L2 multicast trace request packet. The value field can contain all zeros.

The LHR can forward the L2 multicast trace request packet to all downstream switches of the multicast group. In the example shown in FIG. 1, LHR 118 can forward the L2 multicast trace request packet to L2 switches 120 and 122. According to some aspects, the LHR can detect a coupled downstream L2 switch using IGMP snooping. In an L2 network with multiple hops, each L2 switch can forward the IGMP join messages from client devices toward the IGMP Querier. For example, a switch directly coupled to a client device can receive a join message from the client and forward the join message upstream toward the IGMP querier (which can be the LHR). Switches in between can process the join messages and forward them toward the IGMP querier. For a given multicast group G, the IGMP logic in the LHR or switch can have information about the L2 ports that received the join messages from a downstream network device (e.g., a switch or a client device). To determine whether a join message is from a client device or a downstream switch, the LHR or switch can use the device information included in Link Layer Discovery Protocol (LLDP) messages. For example, the LLDP information can be sent by devices in the form of an Ethernet frame that includes a sequence of type-length-value (TLV) structures. A special TLV can include information about the system capabilities (e.g., whether the device is a router, an access point, a switch, or a client device). In the example shown in FIG. 1, LHR 118 can determine that devices 104, 120, and 122 have sent join messages for a multicast group G. In addition, based on the LLDP information received from devices 104, 120, and 122, LHR 118 can determine that device 104 is a client device (e.g., a laptop computer) and that devices 120 and 122 are switches (e.g., Wi-Fi access points). Accordingly, LHR 118 can forward the L2 multicast trace request packet to switches 120 and 122.

An L2 switch receiving the L2 multicast trace request packet can then determine whether it is a last-hop switch (i.e., it is not coupled to any additional downstream switch) or an intermediate switch (i.e., it is coupled to at least one downstream switch) for the multicast group. More specifically, the L2 switch can make such a determination based on received multicast join messages and LLDP messages. In the example shown in FIG. 1, L2 switches 122 and 124 are last-hop L2 switches, and L2 switch 120 is an intermediate switch.

Each switch (whether an intermediate switch or a last-hop switch) can append an additional data block to the received L2 multicast trace request packet. The additional data block can include address information associated with the switch. According to one aspect, this additional data block can be an ARB defined by RFC 8487 of the IETF.

FIG. 2B illustrates an example of the data block appended to the L2 multicast trace request packet by a switch, according to one aspect of the instant application. ARB 210 can be similar to ARB 200, except that the augmented response type field of ARB 210 is 0X3, indicating that ARB 210 is associated with an L2 switch. The value field of ARB 210 can carry the address information about the L2 switch. In this example, the value field can carry the system media access control (MAC) address of the L2 switch. In a different example, the value field can carry the MAC address of the interface receiving the L2 multicast trace request packet. Using FIG. 1 as an example, the value field of the ARB associated with L2 switch 120 can carry the MAC address of the interface of L2 switch 120 that is coupled to LHR 118.

When a client device belonging to the multicast group is detected by an intermediate or last-hop switch to which the client device is coupled, the intermediate or last-hop switch can also append a data block to a received L2 multicast trace request packet to include information about the client device. According to one aspect, the data block can also be an ARB defined by RFC 8487 of the IETF. When a switch is coupled to multiple client devices, the switch can add one ARB for each client device.

FIG. 2C illustrates an example of the data block associated with a client device, according to one aspect of the instant application. ARB 220 can be similar to ARB 200 and ARB 210, except that the augmented response type field of ARB 220 is 0X4, indicating that ARB 220 is associated with a client device. The value field of ARB 220 can carry the address information about the client device. In this example, the value field can carry the MAC address of the client device. In a different example, in addition to the address information, other information about the client device (such as the type of the device, the serial number of the device, etc.) can also be included in the value field of ARB 220. Using FIG. 1 as an example, an ARB associated with client device 106 can be added to the L2 multicast trace request by L2 switch 120, an ARB associated with client device 108 can be added by L2 switch 124, and ARBs associated with client devices 110 and 112 can be added by L2 switch 122.

Once a last-hop L2 switch (e.g., switch 122 or 124 in FIG. 1) has appended ARBs for all coupled client devices to the L2 multicast trace request packet (one ARB per client device), the last-hop L2 switch can convert the L2 multicast trace request packet into a reply packet (e.g., by changing the type field) and send the reply packet to the LHR as a unicast packet. The ARBs included in the reply packet carry information about all L2 switches and client devices on the path of the request packet, thus facilitating the LHR in determining the multicast path. For example, the LHR can extract the address of each L2 switch on the path from the reply packet. Because the network can include multiple last-hop L2 switches, the LHR can receive multiple L2 multicast reply packets. According to some aspects of the instant application, the LHR can aggregate path information from multiple received reply packets and display the aggregated path information to users (e.g., a network administrator).

Figure 3:
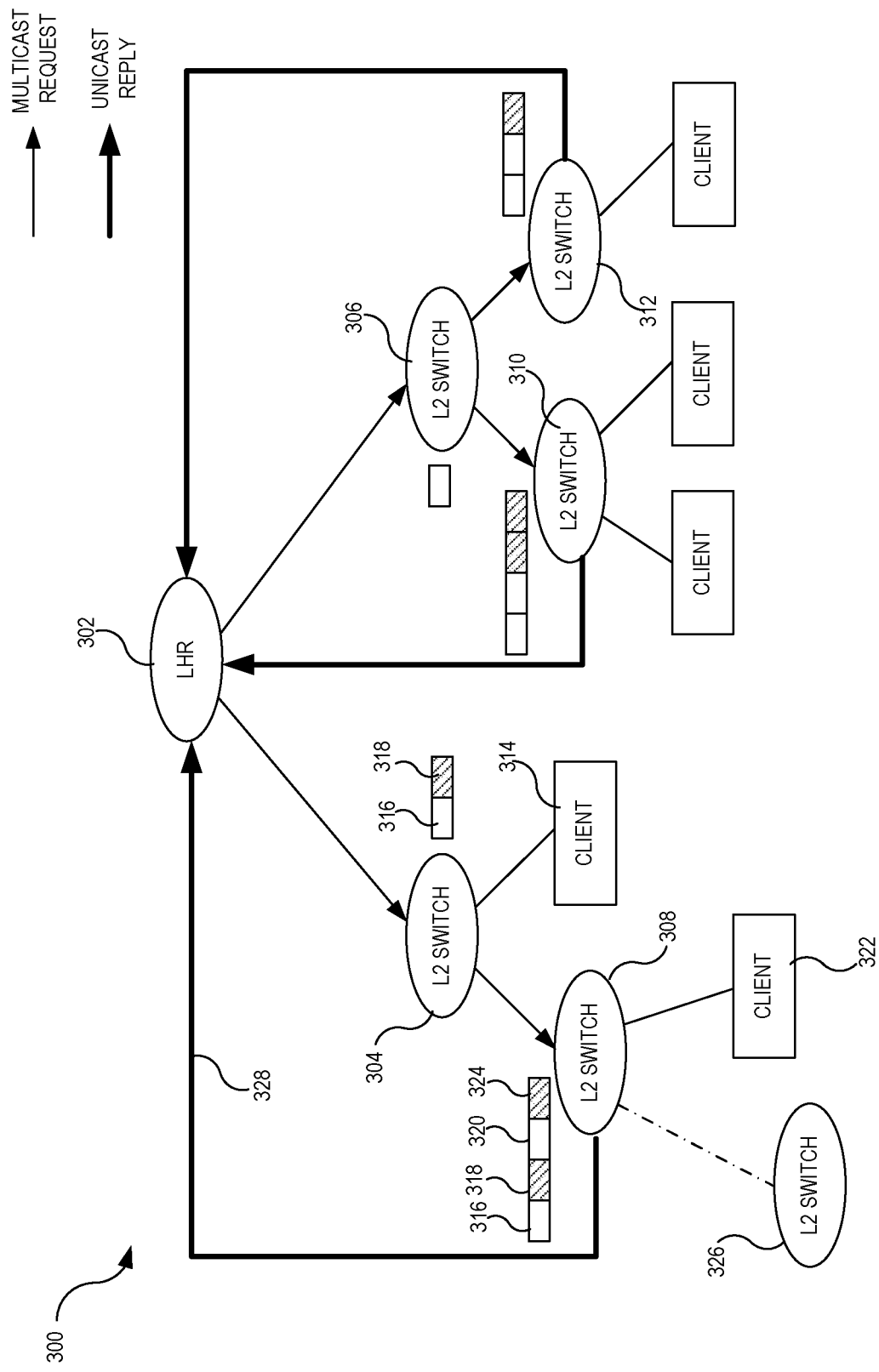
FIG. 3 illustrates in more detail a multicast path tracing scenario in a layer-2 network, according to one aspect of the instant application.

FIG. 3 illustrates in more detail a multicast path tracing scenario in a layer-2 network, according to one aspect of the instant application. In FIG. 3, an L2 network 300 associated with a multicast group (S, G) can include an LHR 302 and L2 switches 304-312. LHR 302 can receive multicast join requests (e.g., IGMP joins) for the multicast group (S, G) from L2 switches 304 and 306. To initiate a multicast trace operation in L2 network 300, LHR 302 can multicast a request packet to L2 switches 304 and 308, as indicated by the arrows pointing from LHR 302 to L2 switches 304 and 306. The multicast trace request packet can specify a multicast group (S, G), with S being the source address and G being the multicast group address. The request packet can include an ARB with its augmented response type set as 0X2, indicating that the request packet is an L2 multicast trace request packet.

L2 switch 304 can determine that, for the multicast group specified by the request packet, it is coupled to a downstream L2 switch 308 and a client device 314. Accordingly, L2 switch 304 can append two ARBs to the request packet, one for itself and one for client device 314. In the example shown in FIG. 3, an ARB corresponding to L2 switch 304 is represented by an unshaded block 316, and an ARB corresponding to client device 314 is represented by a shaded block 318. ARB 316 can include address information associated with L2 switch 304, and ARB 318 can include address information associated with client device 314. L2 switch 304 can subsequently send the appended L2 multicast trace request packet to downstream L2 switch 308.

Upon receiving the L2 multicast trace request packet, L2 switch 308 can append an ARB 320 carrying its address information to the request packet. L2 switch 308 can further detect a coupled client device 322 belonging to the multicast group. Accordingly, L2 switch 308 can append an ARB 324 carrying the address information of client device 322 to the request packet.

L2 switch 308 can further determine whether it is a last-hop L2 switch for the multicast group based on the multicast join messages sent by coupled devices and the LLDP information about those coupled devices. In the example shown in FIG. 3, L2 switch 308 can determine that it is a last-hop L2 switch for the multicast group because there is no downstream L2 switch for the multicast group coupled to L2 switch 308. Note that, although FIG. 3 shows an L2 switch 326 physically coupled to L2 switch 308, L2 switch 326 does not send the multicast join message for the group (S, G), meaning that L2 switch 326 is not part of the multicast network for the group (S, G). Therefore, in FIG. 3, a dashed line is used to show the connection between L2 switches 308 and 326.

In response to determining that it is the last-hop switch, L2 switch 308 can convert the request packet, which can now include four additional ARBs, into a reply packet. L2 switch 308 can further send the reply packet as a unicast packet to LHR 302, as indicated by thickened arrow 328 pointing from LS switch 308 to LHR 302. As can be seen in FIG. 3, the four additional ARBs included in the reply packet can include information about all L2 switches (i.e., switches 304 and 308) and client devices (e.g., client devices 314 and 322) encountered by the request packet along the path. Therefore, this reply packet can provide sufficient path information to LHR 302.

The behaviors of L2 switches on other branches can be similar to switches 304 and 308 discussed above. For example, L2 switch 306 can append an ARB carrying its own address information to the request packet and populate the request packet to interfaces coupled to last-hop L2 switches 310 and 312. Last-hop L2 switch 310 can append three additional ARBs to the request packet, one ARB carrying its own address information and the other two ARBs each carrying the address information of a coupled client device. Similarly, last-hop L2 switch 312 can append two ARBs, one ARB carrying its own address information and the other ARB carrying the address information of a coupled client device. Last-hop L2 switches 310 and 312 can each send a unicast reply packet to LHR 302, with the reply packet including address information of switches and client devices encountered by a corresponding request packet.

As can be seen from FIG. 3, the L2 multicast trace request packet can branch out at an L2 switch coupled to multiple downstream switches, thus creating an L2 multicast trace tree routed at the LHR and terminated at last-hop L2 switches. By aggregating path information included in reply packets sent from the last-hop switches, the LHR can have complete path information about the L2 multicast trace tree.

Figure 4:
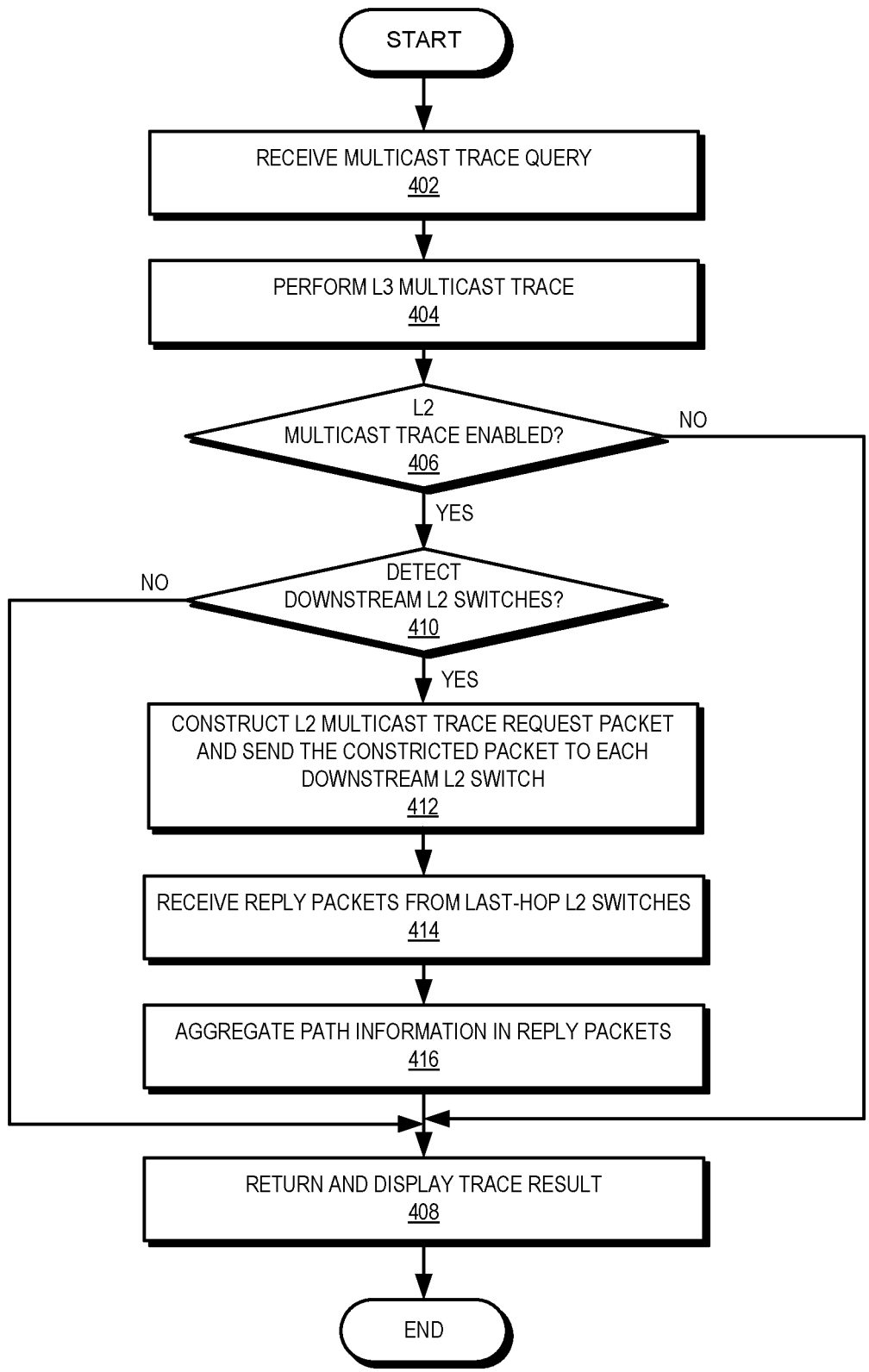
FIG. 4 presents a flowchart illustrating an example of a multicast path tracing process performed at the last-hop router, according to one aspect of the instant application.

FIG. 4 presents a flowchart illustrating an example of a multicast path tracing process performed at the last-hop router, according to one aspect of the instant application. During operation, the LHR can receive a multicast trace query for a particular multicast group (operation 402). The multicast trace query can be an enhanced query that requires path tracing in both the L3 and L2 networks. The LHR can perform the L3 multicast trace (Mtrace) operation (operation 404) and determine whether the L2 multicast trace function is enabled on the LHR (operation 406). Note that the L2 multicast trace function can be user configurable.

If the L2 multicast trace function is not enabled, the trace is completed and the LHR can return and display the trace result (operation 408). If the L2 multicast trace function is enabled, the LHR can determine whether downstream L2 switches can be detected (operation 410). A downstream device for the multicast group can be detected based on a multicast joint request (e.g., an IGMP join message) received at an interface of the LHR, and the LHR can determine whether the downstream device is a switch or a client device based on the LLDP information about the device.

If no downstream L2 switch can be detected, the trace is completed and the LHR can return and display the trace result (operation 408). If one or more downstream L2 switches can be detected, the LHR can construct a request packet and send the request packet to each downstream L2 switch (operation 412). According to some aspects, the LHR can append a special data block (e.g., an ARB) with a special type field (e.g., 0X2) to indicate that the request packet is an L2 multicast trace request packet, thus causing the receiving L2 switch to propagate the request packet downstream until it reaches a last-hop L2 switch. The value field in the special data block can contain zeros.

The LHR can subsequently receive reply packets from last-hop switches (operation 414). Each reply packet can include one or more additional data blocks, with each data block carrying information about an L2 switch or a client device present on the path of the corresponding request packet. For example, a data block associated with an L2 switch can be an ARB with its augmented response type field set as 0X3 and its value field carrying the address information associated with the L2 switch; and a data block associated with a client device can be an ARB with its augmented response type field set as 0X4 and its value field carrying the MAC address of the client device. The address information associated with an L2 switch can be its system MAC address or the MAC address of the interface receiving the L2 multicast trace request.

The LHR can then aggregate the path information in the reply packets from all last-hop L2 switches (operation 416). Because each last-hop switch corresponds to a branch of the multicast tree, the reply packets from all switches can include complete path information of the multicast tree. The LHR can then return and display the trace result (operation 408).

Figure 5:
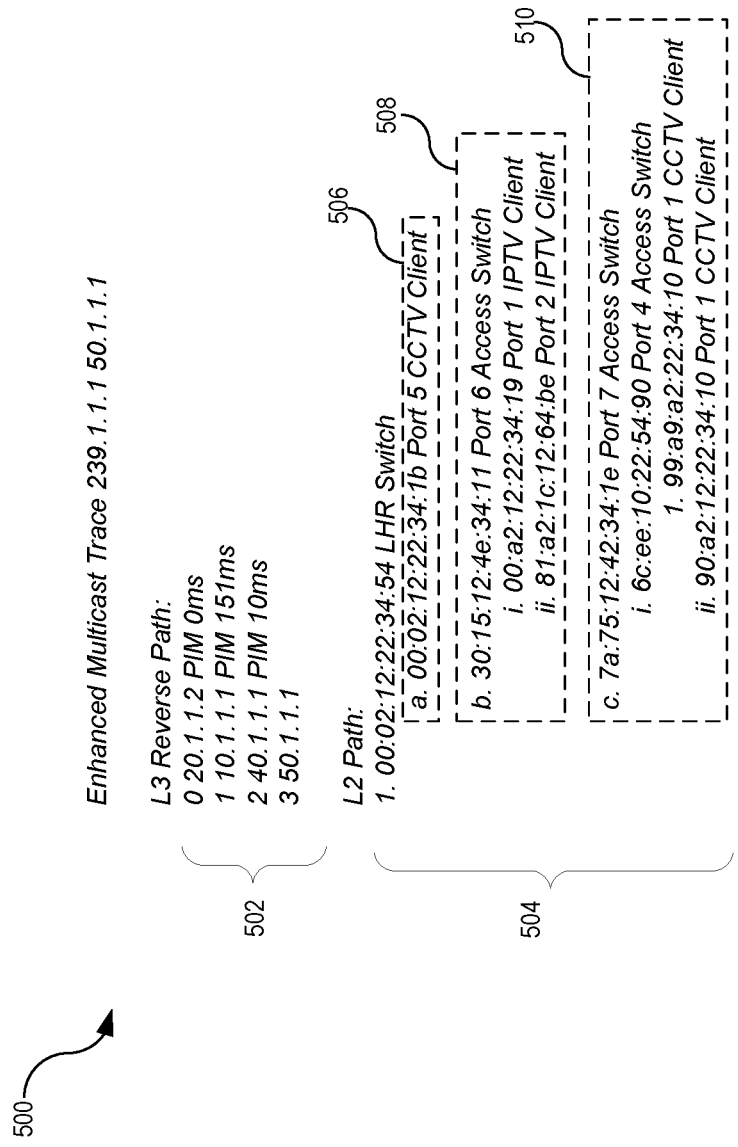
FIG. 5 presents an example of a displayed multicast trace result, according to one aspect of the instant application.

FIG. 5 presents an example of a displayed multicast trace result, according to one aspect of the instant application. More specifically, FIG. 5 displays the result of an enhanced multicast trace operation for a multicast group (50.1.1.1, 239.1.1.1), where 50.1.1.1 is the source IP address and 239.1.1.1 is the multicast group address. Displayed trace result 500 includes two sections. The top section (i.e., section 502) indicates the L3 Mtrace reverse path between source 50.1.1.1 and LHR 20.1.1.2. The bottom section (i.e., section 504) indicates the L2 multicast trace result, which includes the MAC address of the LHR (i.e., line 1 in section 504) and the three main branches (i.e., branches 506-510) coupled to the LHR. Each branch can include one or more client devices and/or one or more L2 switches. Lines a, b, and c in section 504 indicate the three directly connected switches/clients which have sent join messages to the LHR for group 239.1.1.1. Similarly, entries under each L2 switch indicate the switches/clients that are directly connected to that L2 switch and are listening for the traffic destined for group 239.1.1.1. Note that the multicast path shown in FIG. 5 can correspond to multicast network 100 shown in FIG. 1, where the three branches in FIG. 5 correspond to client device 104 and switches 120 and 122, respectively. According to some aspects, the multicast trace result can be displayed at the LHR (e.g., by a display associated with the LHR). According to other aspects, the multicast trace result can be returned to the client initiating the multicast trace operation and displayed on a display associated with the client.

Figure 6:
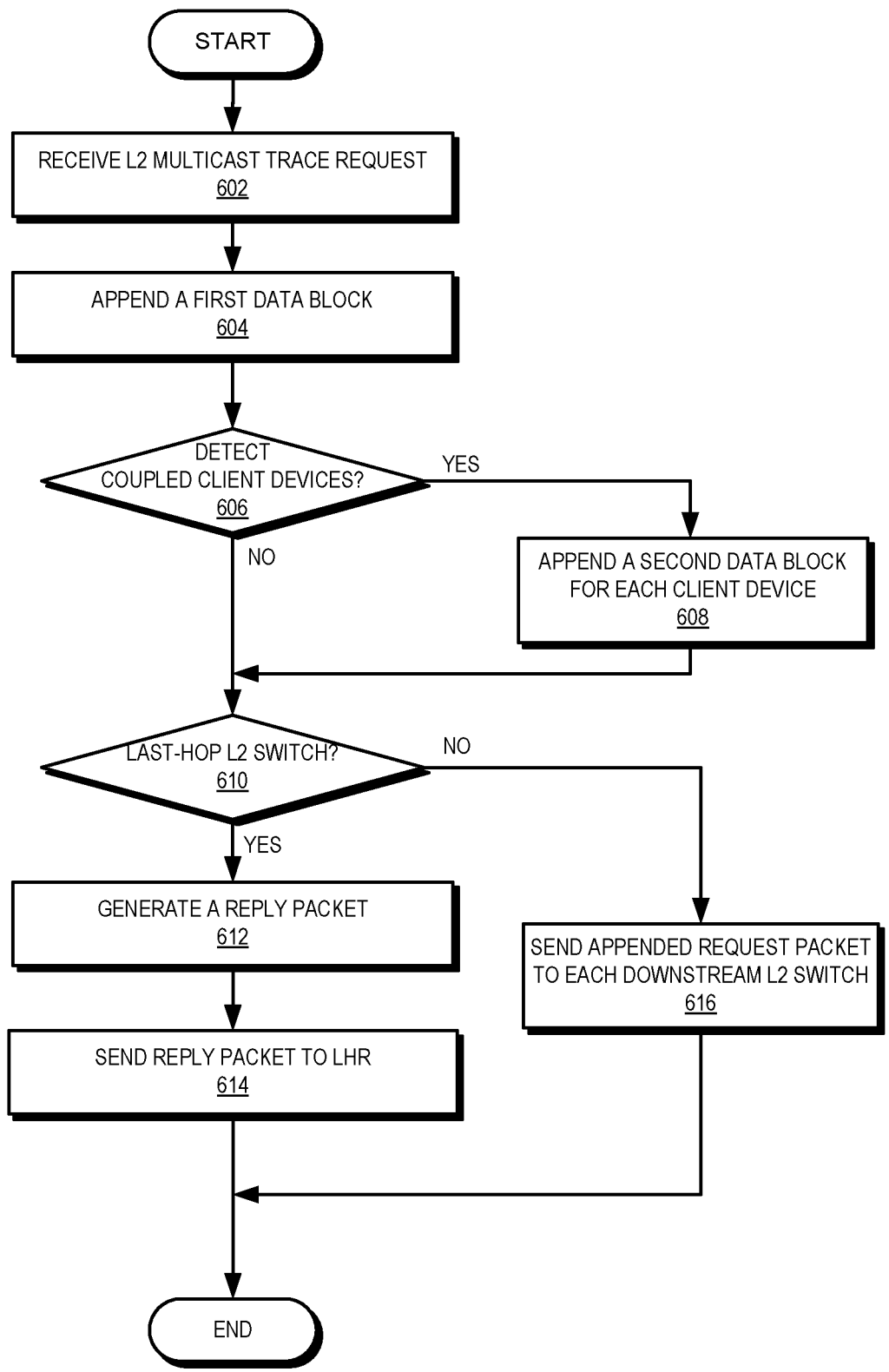
FIG. 6 presents a flowchart illustrating an example of a multicast path tracing process performed at a layer-2 switch, according to one aspect of the instant application.

FIG. 6 presents a flowchart illustrating an example of a multicast path tracing process performed at a layer-2 switch, according to one aspect of the instant application. During operation, an L2 switch can receive an L2 multicast trace request packet associated with a multicast group (operation 602). The request packet can include a special data block (e.g., an ARB with an augmented response type 0X2) indicating that the packet is an L2 multicast trace request packet. The request packet can be received from an LHR or an upstream stream L2 switch.

Upon receiving the request packet, the L2 switch can append the packet with a first data block that carries address information about the L2 switch (operation 604). According to one aspect, the first data block can be an ARB with its response type set as 0X3, and the value field of the ARB can include the system MAC address of the L2 switch or the MAC address of the interface that receives the request packet.

The L2 switch can further determine whether client devices belonging to the multicast group can be detected (operation 606). According to some aspects, such a determination can be made based on the multicast join messages received at the L2 switch from coupled devices and the LLDP information about these coupled devices. For example, based on the join messages, the L2 switch can determine which coupled devices are listening to the traffic destined for the multicast group; and based on the LLDP messages sent by each device, the L2 switch can determine whether the device is a client device or an L2 switch (e.g., an Ethernet switch or a Wi-Fi access point). If one or more client devices coupled to the L2 switch and belonging to the multicast group are detected, the L2 switch can append a second data block to the request for each detected client device. According to one aspect, the second data block can be an ARB with its augmented response type set as 0X4, and the value field of the ARB can include the MAC address of the corresponding client device.

The L2 switch can subsequently determine whether it is a last-hop L2 switch (operation 610). This determination can also be made based on received multicast join messages and LLDP messages. If the L2 switch is a last-hop switch, it can generate a reply packet based on the request packet that has been appended with a number of data blocks, with each data block corresponding to a switch or a client device encountered by the request packet (operation 612). Note that a client device is said to be encountered by the request packet if and only if it belongs to the multicast group and is directly coupled to a switch on the path of the request packet. According to one aspect, the L2 switch can convert the request packet into a reply packet by changing the type field of the packet from 0X02 to 0X03. The L2 switch can then send the reply packet as a unicast packet to the LHR (operation 614). If the L2 switch is not a last-hop switch, meaning that it is directly coupled to one or more downstream L2 switches, the L2 switch can forward the request packet with the appended data blocks to each directly coupled downstream switch (operation 616).

In addition to regular L2 networks (e.g., Ethernet networks), the above L2 multicast trace techniques can also be applied to overlay networks with extended L2 virtual networks across VXLAN tunnel endpoints (VTEPs). The L2 multicast trace capability can be extended to all leaf VTEPs. This is very important as the current Mtrace will not be able to trace packets in VXLAN Networks. The same solution will be able to trace the packets when the multicast route is shared between VTEPs using L3 virtual network identifiers (VNIs) as well as L2 VNIs. In one example, the L2 network can include a virtual system extension (VSX) cluster, with both VSX peers behaving similarly as an L2 switch. More specifically, both VSX peers can receive the trace request packet from upstream due to VLAN flooding. Each peer can then perform similar L2 multicast trace operations, which can include appending client information to the request packet. If there are clients but no further downstream L2 switches, a reply packet can be sent to the LHR. If there are downstream L2 switches, the L2 multicast trace operation would continue by propagating the request packet downstream.

Figure 7A:
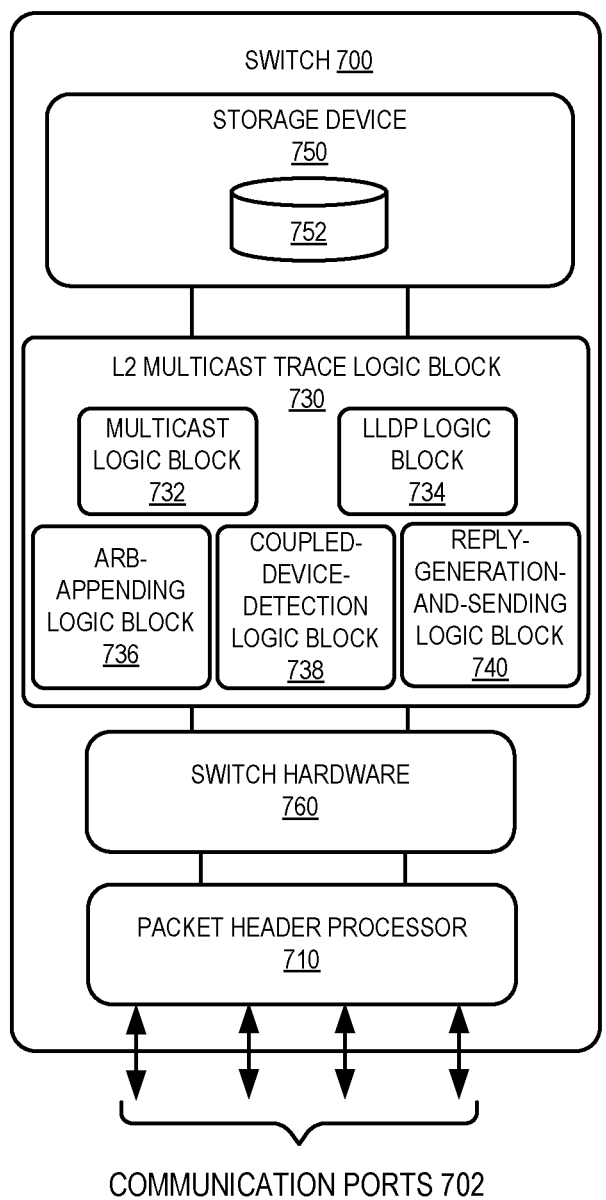
FIG. 7A illustrates an example of a switch supporting layer-2 multicast path tracing, according to one aspect of the present application.

FIG. 7A illustrates an example of a switch supporting layer-2 multicast path tracing, according to one aspect of the present application. In this example, a switch 700 can include a number of communication ports 702, a packet header processor 710, and a storage device 750. Switch 700 can also include switch hardware 760 (e.g., processing hardware of switch 700, such as its application-specific integrated circuit (ASIC) chips), which includes information based on which switch 700 processes packets (e.g., determines output ports for packets). Packet header processor 710 can perform the standard packet-processing function by extracting and processing header information from the received packets. Packet header processor 710 can identify a switch identifier (e.g., a MAC address and/or an IP address) associated with switch 700 in the header of a packet.

Communication ports 702 can include inter-switch communication channels for communication with other switches and/or user devices. The communication channels can be implemented via a regular communication port and based on any open or proprietary format. Communication ports 702 can include one or more Ethernet ports capable of receiving frames encapsulated in an Ethernet header. Communication ports 702 can also include one or more IP ports capable of receiving IP packets. An IP port is capable of receiving an IP packet and can be configured with an IP address. Packet header processor 710 can process Ethernet frames and/or IP packets. A respective port of communication ports 702 may operate as an ingress port and/or an egress port.

Switch 700 can maintain a database 752 (e.g., in storage device 750). Database 752 can be a relational database and may run on one or more Database Management System (DBMS) instances. Database 752 can store information associated with the routing, configuration, and interfaces of switch 700. Switch 700 can include an L2 multicast trace logic block 730 that can allow switch 700 to process an L2 multicast trace request packet.

L2 multicast trace logic block 730 can include a multicast logic block 732, an LLDP logic block 734, an ARB-appending logic block 736, a coupled-device-detection logic block 738, and a reply-generation-and-sending logic block 740. Multicast logic block 732 can track multicast join messages (e.g., IGMP join messages) received from coupled switches and client devices. LLDP logic block 734 can collect LLDP information about those coupled switches and client devices. ARB-appending logic block 736 can be responsible for appending ARBs to a received L2 multicast trace request packet. Coupled-device-detection logic block 738 can be responsible for detecting any downstream L2 switches or client devices directly coupled to switch 700 via communication ports 702. Reply-generation-and-sending logic block 740 can be responsible for generating a reply packet to the received L2 multicast trace request packet if coupled-device-detection logic block 738 detects that there is no downstream L2 switch directly coupled to switch 700.

Figure 7B:
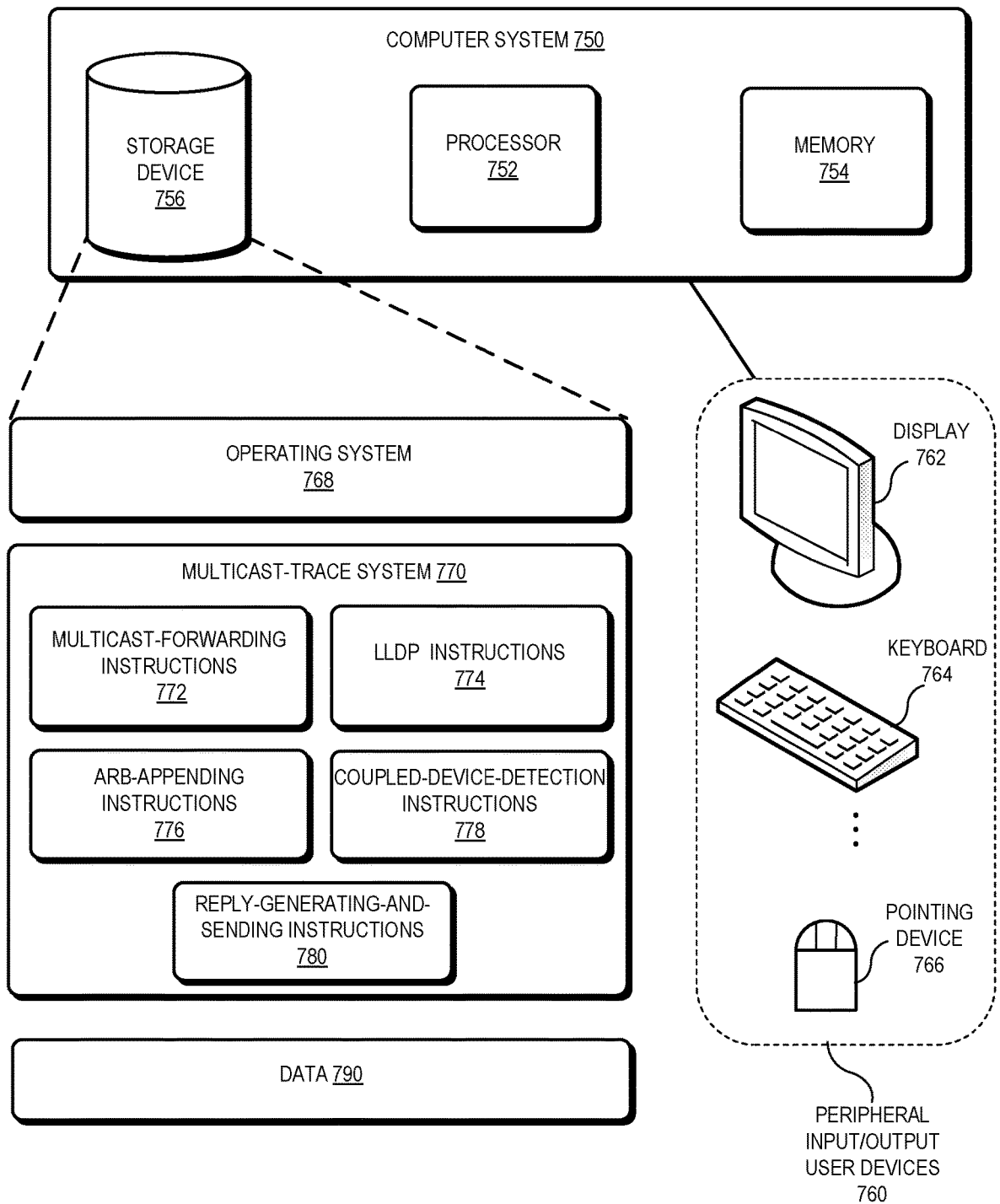
FIG. 7B illustrates an example of a computer system implemented on a layer-2 switch to support multicast path tracing, according to one aspect of the instant application.

FIG. 7B illustrates an example of a computer system implemented on a layer-2 switch to support multicast path tracing, according to one aspect of the instant application. Computer system 750 can include a processor 752, a memory 754, and a storage device 756. Furthermore, computer system 750 can be coupled to peripheral input/output (I/O) user devices 760, e.g., a display device 762, a keyboard 764, and a pointing device 766. Storage device 756 can store an operating system 768, a multicast-trace system 770, and data 790.

Multicast-trace system 770 can include instructions, which when executed by computer system 750, can cause computer system 750 or processor 752 to perform methods and/or processes described in this disclosure. Multicast-trace system 770 can include instructions for performing the multicast forwarding operations (multicast-forwarding instructions 772), instructions for performing LLDP operations (LLDP instructions 774), instructions for appending ARBs to a received L2 multicast trace request packet (ARB-appending instructions 776), instructions for detecting coupled devices (coupled-device-detection instructions 778), and instructions for generating and sending a reply packet (reply-generating-and-sending instructions 780).

Figure 8A:
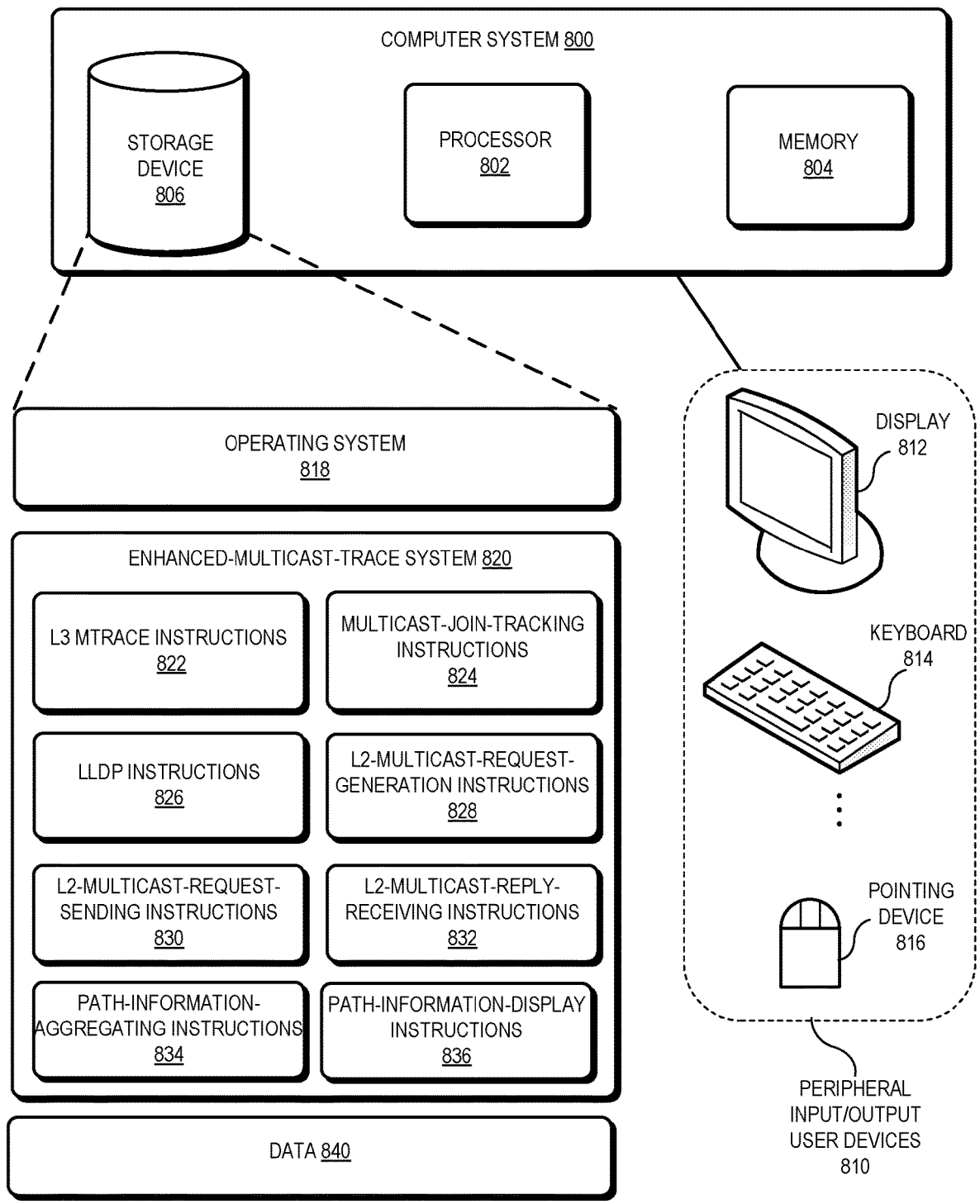
FIG. 8A illustrates an example of a computer system that facilitates enhanced multicast path tracing, according to one aspect of the instant application.

FIG. 8A illustrates an example of a computer system that facilitates enhanced multicast path tracing, according to one aspect of the instant application. Computer system 800 can include a processor 802, a memory 804, and a storage device 806. Furthermore, computer system 800 can be coupled to peripheral input/output (I/O) user devices 810, e.g., a display device 812, a keyboard 814, and a pointing device 816. Storage device 806 can store an operating system 818, an enhanced-multicast-trace system 820, and data 840. According to some aspects, computer system 800 can be embodied as various function blocks included in an L3 router (e.g., the LHR in a multicast network).

Enhanced-multicast-trace system 820 can include instructions, which when executed by computer system 800, can cause computer system 800 or processor 802 to perform methods and/or processes described in this disclosure. Specifically, by executing these instructions, computer system 800 can achieve the goal of performing multicast trace in both the L3 and L2 networks. Enhanced-multicast-trace system 820 can include instructions for performing the L3 Mtrace operation (L3 Mtrace instructions 822), instructions for tracking devices sending the multicast join messages (multicast-join-tracking instructions 824), instructions for collecting LLDP information about coupled devices (LLDP instructions 826), instructions for generating an L2 multicast trace request packet (L2-multicast-request-generation instructions 828), instructions for sending the L2 multicast trace request packet to downstream L2 switches (L2-multicast-request-sending instructions 830), instructions for receiving L2 multicast reply packets (L2-multicast-reply-receiving instructions 832), instructions for aggregating path information from multiple L2 multicast reply packets (pathinformation-aggregating instructions 834), and instructions for displaying the multicast path information (path-information-display instructions 836).

Figure 8B:
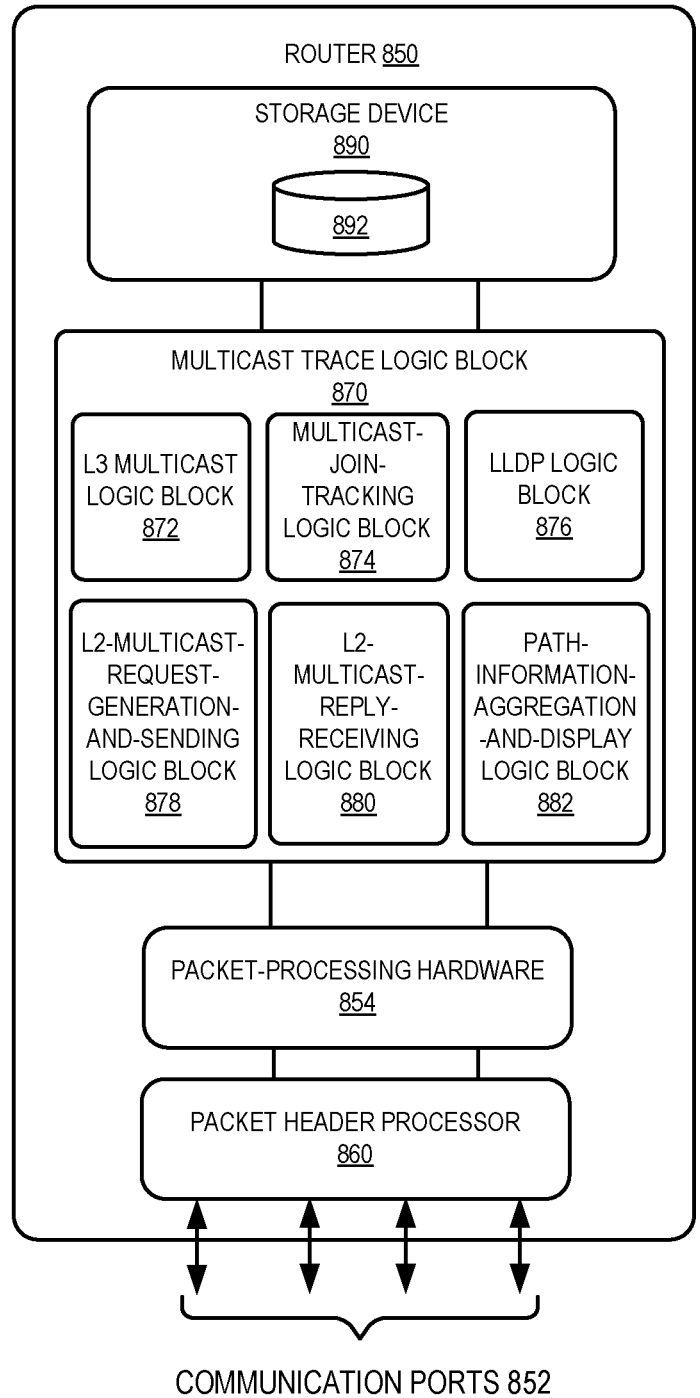
FIG. 8B illustrates an example of a layer-3 router supporting enhanced multicast path tracing, according to one aspect of the present application.

FIG. 8B illustrates an example of a layer-3 router supporting enhanced multicast path tracing, according to one aspect of the present application. In this example, a router 850 can include a number of communication ports 852, a packet header processor 860, and a storage device 890. Router 850 can also include packet-processing hardware 854 (such as its application-specific integrated circuit (ASIC) chips). Packet header processor 860 can perform the standard packet-processing function by extracting and processing header information from the received packets.

Communication ports 852 can include IP ports and Ethernet ports. Packet header processor 860 can process IP packets and Ethernet frames. A respective port of communication ports 852 may operate as an ingress port and/or an egress port.

Router 850 can maintain a database 892 (e.g., in storage device 890). Database 892 can be a relational database and may run on one or more Database Management System (DBMS) instances. Database 892 can store information associated with the routing, configuration, and interfaces of router 850. Router 850 can include a multicast trace logic block 870 that can facilitate the enhanced multicast trace operation.

L2 multicast trace logic block 870 can include a L3 multicast logic block 872, a multicast-join-tracking logic block 874, an LLDP logic block 876, an L2-multicast-request-generation-and-sending logic block 878, an L2-multicast-reply-receiving logic block 880, and a path-information-aggregation-and display logic block 882. L3 multicast logic block 872 can perform the standard Mtrace operation. Multicast-join-tracking logic block 874 can track multicast join messages (e.g., IGMP join messages) received from coupled switches and client devices. LLDP logic block 876 can collect LLDP information about those coupled switches and client devices. L2-multicast-request-generation-and-sending logic block 878 can be responsible for generating and sending an L2 multicast trace request packet to each coupled L2 switch. L2-multicast-reply-receiving logic block 880 can receive the reply packet from the last-hop L2 switches. Path-information-aggregation-and display logic block 882 can aggregate L2 path information from received reply packets and display the L2 and L3 path information.

In the examples shown in FIG. 7A-8B, the L2 switch and the L3 router are shown as separate entities. In practice, it is also possible to integrate an L2 switch and an L3 router into a single device capable of performing both the L3 routing and the L2 switching functions.

In general, the proposed solution extends the current multicast trace functionality in the L3 network to the L2 domain. More specifically, the solution includes configuring the LHR to construct a new type of request packet, an L2 multicast trace request packet. The L2 multicast trace request packet can include an Augmented Response Block (ARB) with predefined type and value fields and can be forwarded to all downstream L2 switches coupled to the LHR based on the IGMP join information for the traced multicast group. The join information can specify which port has previously received a join request for the multicast group. Each L2 switch receiving the L2 multicast trace request packet can append an ARB carrying its own address information to the request packet and an ARB for each directly coupled client device belonging to the multicast group. The L2 switch can continue to propagate the request packet downstream until it reaches a last-hop L2 switch.

After appending ARBs carrying its own address information and address information about coupled client devices, a last-hop L2 switch can convert the L2 multicast trace request packet into an L2 multicast trace reply packet, which can now include the ARBs from all encountered switches and client devices. The last-hop L2 switch can then send the L2 multicast trace reply packet as an unicast packet to the LHR, which can aggregate path information included in reply packets received from multiple last-hop L2 switches to obtain complete multicast path information. The LHR can then display the trace result, which can include both the L3 path information and the L2 path information.

One aspect of the instant application can provide a system and method for enhanced multicast tracing. During operation, a layer-3 (L3) router can receive a trace query to trace multicast paths associated with a multicast group. In response to detecting a layer-2 (L2) switch coupled to the L3 router, the L3 router can construct a request packet and send the request packet to the coupled L2 switch. The request packet comprises a first data block indicating that the request packet is an L2 multicast trace request, thereby causing the L2 switch to propagate the request packet to each downstream L2 switch in the multicast group until the request packet reaches a last-hop L2 switch. The L3 router can receive, from the last-hop L2 switch, a reply packet responsive to the L2 multicast trace request, the reply packet comprising one or more data blocks, with each data block comprising information about an L2 switch or client device present on a traversed multicast path for the multicast group.

In a variation on this aspect, the L3 router can be a last-hop router associated with the multicast group.

In a further variation, the system can detect a number of L3 routers between a source of the multicast group and the last-hop router.

In a variation on this aspect, the L2 switch coupled to the L3 router can be detected based on a multicast join message received at a corresponding interface of the L3 router.

In a further variation, the multicast join message can include an Internet Group Management Protocol (IGMP) join request specifying a source address and a group address associated with the multicast group.

In a variation on this aspect, the first data block can include an Augmented Response Block (ARB) comprising an augmented response type field set as 0X2.

In a further variation, a data block associated with a downstream L2 switch can include an ARB comprising an augmented response type field set as 0X3 and a value field carrying a media access control (MAC) address of an interface receiving the request packet.

In a further variation, a data block associated with a client device can include an ARB comprising an augmented response type field set as 0X4 and a value field carrying a MAC address of the client device.

In a variation on this aspect, the system can aggregate path information included in reply packets received from multiple last-hop L2 switches and return the aggregated path information to a client initiating the request.

One aspect of the instant application can provide a system and method for enhanced multicast tracing. During operation, a layer-2 (L2) switch can receive a request packet for tracing multicast paths associated with a multicast group, the request packet being originated from a layer-3 (L3) router. The L2 switch can append a first data block comprising information associated with the L2 switch to the request packet. In response to detecting that a client device associated with the multicast group is coupled to the L2 switch, the L2 switch can append a second data block comprising information associated with the coupled client device to the request packet. In response to detecting that a downstream L2 switch associated with the multicast group is coupled to the L2 switch, the L2 switch can propagate the appended request packet to the downstream L2 switch. In response to detecting that the L2 switch is a last-hop switch, the L2 switch can generate a reply packet based on the appended request packet and send the reply packet to the L3 router.

In a variation on this aspect, the client device or downstream L2 switch can be detected based on a multicast join message and a Link Layer Discovery Protocol (LLDP) message sent by the client device or downstream L2 switch.

In a further variation, the multicast join message can include an Internet Group Management Protocol (IGMP) join request specifying a source address and a group address associated with the multicast group.

In a variation on this aspect, the received request packet can include a third data block indicating that the request packet is an L2 multicast trace request.

In a further variation, the third data block can include an Augmented Response Block (ARB) comprising a type field 0X2.

In a variation on this aspect, the first data block can include an Augmented Response Block (ARB) comprising a type field 0X3 and a value field carrying a media access control (MAC) address of an interface receiving the request packet.

In a variation on this aspect, the second data block can include an Augmented Response Block (ARB) comprising a type field 0X4 and a value field carrying a MAC address of the client device.

The above description is presented to enable any person skilled in the art to make and use the examples and is provided in the context of a particular application and its requirements. Various modifications to the disclosed examples will be readily apparent to those skilled in the art, and the general principles defined herein may be applied to other implementations and applications without departing from the spirit and scope of the present disclosure. Thus, the scope of the present disclosure is not limited to the examples shown but is to be accorded the widest scope consistent with the principles and features disclosed herein.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. The computer-readable storage medium may be, for example, Random Access Memory (RAM), non-volatile RAM (NVRAM), an Electrically Erasable Programmable Read-Only Memory (EEPROM), a storage device, an optical disc, and the like. The computer-readable storage medium may be a non-transitory storage medium, where the term "non-transitory" does not encompass transitory propagating signals.

Furthermore, the methods and processes described above can be included in hardware devices or apparatus. The hardware devices or apparatus can include, but are not limited to, application-specific integrated circuit (ASIC) chips, field-programmable gate arrays (FPGAs), dedicated or shared processors that execute a particular software unit or a piece of code at a particular time, and other programmable-logic devices now known or later developed. When the hardware devices or apparatus are activated, they perform the methods and processes included within them.

The foregoing descriptions of examples have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method comprising:
  receiving, at a layer-3 (L3) router, a trace query to trace multicast paths associated with a multicast group;
  in response to detecting a layer-2 (L2) switch coupled to the L3 router, constructing a request packet and sending the request packet to the coupled L2 switch, wherein the request packet comprises a first data block indicating that the request packet is an L2 multicast trace request, thereby causing the L2 switch to propagate the request packet to each downstream L2 switch in the multicast group until the request packet reaches a last-hop L2 switch;
  receiving, from the last-hop L2 switch, a reply packet responsive to the L2 multicast trace request, wherein the reply packet comprises one or more data blocks, with each data block comprising information about an L2 switch or client device present on a traversed multicast path for the multicast group,
  wherein the first data block comprises an Augmented Response Block (ARB) comprising an augmented response type field set as 0X2.

2. The method of claim 1, wherein the L3 router is a last-hop router associated with the multicast group.

3. The method of claim 2, further comprising detecting a number of L3 routers between a source of the multicast group and the last-hop router.

4. The method of claim 1, wherein the L2 switch coupled to the L3 router is detected based on a multicast join message received at a corresponding interface of the L3 router.

5. The method of claim 4, wherein the multicast join message comprises an Internet Group Management Protocol (IGMP) join request specifying a source address and a group address associated with the multicast group.

6. The method of claim 1, wherein a data block associated with a downstream L2 switch comprises an ARB comprising an augmented response type field set as 0X3 and a value field carrying a media access control (MAC) address of an interface receiving the request packet.

7. The method of claim 1, wherein a data block associated with a client device comprises an ARB comprising an augmented response type field set as 0X4 and a value field carrying a MAC address of the client device.

8. The method of claim 1, further comprising:
  aggregating path information included in reply packets received from multiple last-hop L2 switches; and
  returning the aggregated path information to a client initiating the request.

9. A method comprising:
  receiving, at a layer-2 (L2) switch, a request packet for tracing multicast paths associated with a multicast group, wherein the request packet is originated from a layer-(L3) router;
  appending a first data block comprising information associated with the L2 switch to the request packet;
  in response to detecting that a client device associated with the multicast group is coupled to the L2 switch, appending a second data block comprising information associated with the coupled client device to the request packet;

in response to detecting that a downstream L2 switch associated with the multicast group is coupled to the L2 switch, propagating the appended request packet to the downstream L2 switch; and in response to detecting that the L2 switch is a last-hop switch, generating a reply packet based on the appended request packet; and sending the reply packet to the L3 router, wherein the first data block comprises an Augmented Response Block (ARB) comprising a type field 0X3 and a value field carrying a media access control (MAC) address of an interface receiving the request packet.

10. The method of claim 9, wherein the client device or downstream L2 switch is detected based on a multicast join message and a Link Layer Discovery Protocol (LLDP) message sent by the client device or downstream L2 switch.

11. The method of claim 10, wherein the multicast join message comprises an Internet Group Management Protocol (IGMP) join request specifying a source address and a group address associated with the multicast group.

12. The method of claim 9, wherein the received request packet comprises a third data block indicating that the request packet is an L2 multicast trace request.

13. The method of claim 12, wherein the third data block comprises an Augmented Response Block (ARB) comprising a type field 0X2.

14. The method of claim 9, wherein the second data block comprises an Augmented Response Block (ARB) comprising a type field 0X4 and a value field carrying a MAC address of the client device.

15. A layer three (L3) router in a multicast network, the router comprising:
   a processor;
   a storage device storing instructions that when executed by the processor cause the processor to perform a method, the method comprising:
      receiving, at the L3 router, a trace query to trace multicast paths associated with a multicast group;
      in response to detecting a layer-2 (L2) switch coupled to the L3 router,
      constructing a request packet and sending the request packet to the coupled L2 switch, wherein the request packet comprises a first data block indicating that the request packet is an L2 multicast trace request, thereby causing the L2 switch to propagate the request packet to each downstream L2 switch in the multicast group until the request packet reaches a last-hop L2 switch;
      receiving, from the last-hop L2 switch, a reply packet responsive to the L2 multicast trace request, wherein the reply packet comprises one or more data blocks, with each data block comprising information about an L2 switch or client device present on a traversed multicast path for the multicast group,
      wherein the first data block comprises an Augmented Response Block (ARB) comprising an augmented response type field set as 0X2.

16. The L3 router of claim 15, wherein the L2 switch coupled to the L3 router is detected based on an Internet Group Management Protocol (IGMP) join request specifying a source address and a group address associated with the multicast group.

17. The L3 router of claim 15,
   wherein a data block associated with a downstream L2 switch comprises an ARB comprising a type field 0X3 and a value field carrying a media access control (MAC) address of an interface receiving the query packet; and
   wherein a data block associated with a client device comprises an ARB comprising a type field 0X4 and a value field carrying a MAC address of the client device.

18. The L3 router of claim 15, wherein the method further comprises:
   aggregating path information included in reply packets received from multiple last-hop L2 switches; and
   returning the aggregated path information to a client initiating the request.

* * * * *